United States Patent [19]

Mills et al.

[11] Patent Number: 5,023,399

[45] Date of Patent: Jun. 11, 1991

[54] SUPPORT ASSEMBLY INCLUDING A STRESS LIMITER FOR NON-METALLIC CABLE, AND METHOD OF FITTING THE STRESS LIMITER

[75] Inventors: Brian P. Mills, Hornchurch; Edward K. George, Rainham, both of England

[73] Assignee: Telephone Cables Limited, England

[21] Appl. No.: 553,876

[22] Filed: Jul. 16, 1990

[30] Foreign Application Priority Data

Jul. 31, 1989 [GB] United Kingdom ............... 8917472

[51] Int. Cl.$^5$ ........................................ H02G 15/064
[52] U.S. Cl. .................................. 174/73.1; 174/127; 174/144
[58] Field of Search ................. 174/73.1, 127, 140 R, 174/140 S, 140 H, 140 CR, 144

[56] References Cited

U.S. PATENT DOCUMENTS 1,288,751 12/1918 Thordarson .................. 174/127 X
1,387,389 8/1921 Haberli et al. ............... 174/73.1 X
1,730,102 10/1929 Wahlberg .................... 174/140 H

FOREIGN PATENT DOCUMENTS 3330036 3/1984 Fed. Rep. of Germany ...... 174/127

OTHER PUBLICATIONS

"Experience with Optical Fibre Aerial Cables on High Tension Power Lines", by C. Jurdens, et al., Cigre International Conference on Large High Voltage Electric Systems, 1988 Session.

Primary Examiner—Laramie E. Askin
Attorney, Agent, or Firm—Kirschstein, Ottinger, Israel & Schiffmiller

[57] ABSTRACT

A support assembly for non-metallic cable incorporating a metallic support fitting and a preformed metallic stress limiter, the latter including a generally mushroom-shaped hollow body having a tubular stem portion inserted between one end of the support fitting and the cable, and a generally part-toroidal head portion having an outer profile which is smoothly curving.

14 Claims, 1 Drawing Sheet

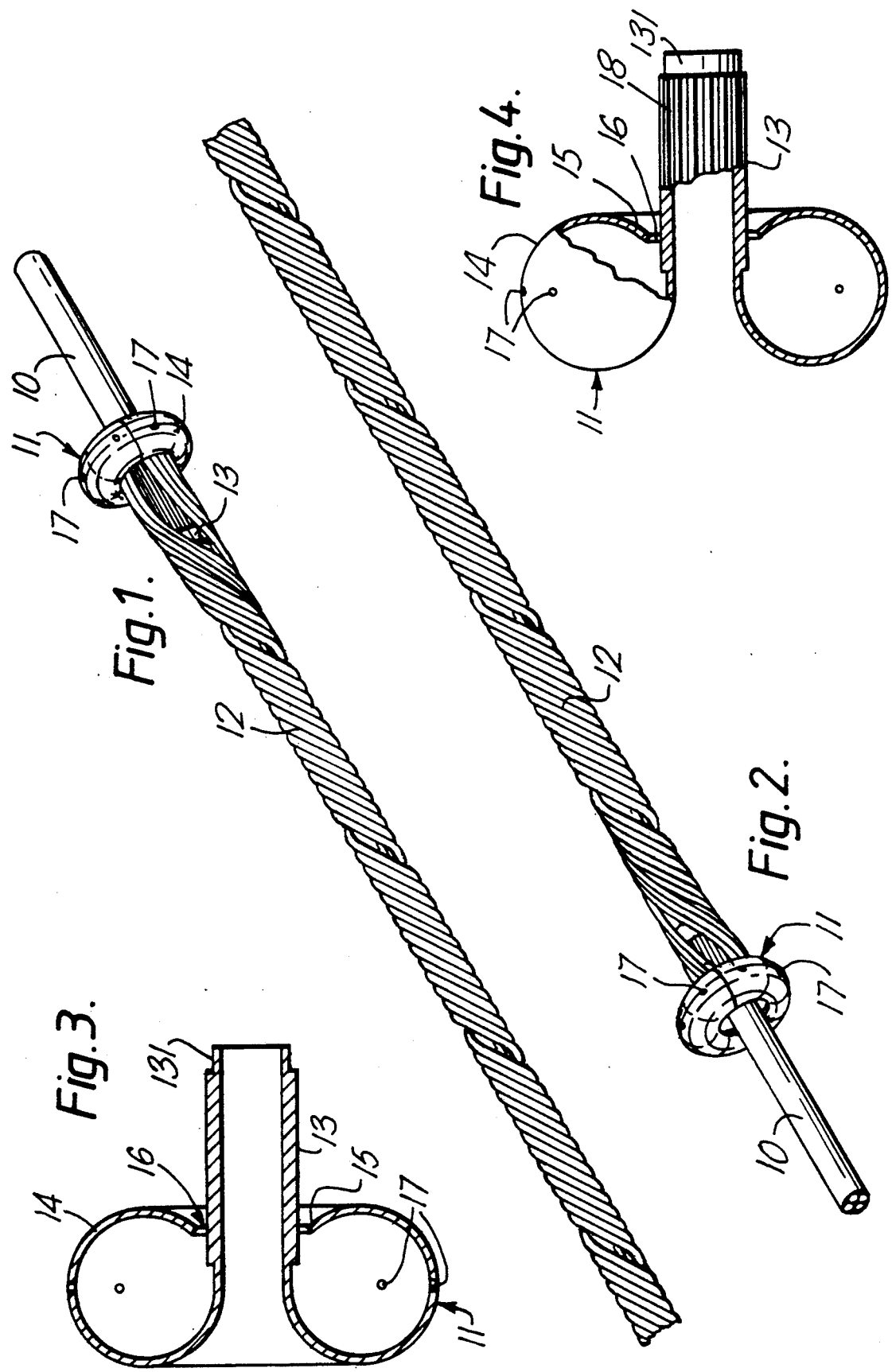

SUPPORT ASSEMBLY INCLUDING A STRESS LIMITER FOR NON-METALLIC CABLE, AND METHOD OF FITTING THE STRESS LIMITER

BACKGROUND OF THE INVENTION

1. Field of the Invention

This invention relates to a support assembly for non-metallic cable comprising a metallic support fitting and a metallic stress limiter for relieving electrical stress between the cable and the support fitting, and is particularly useful with optical aerial cables which are positioned adjacent high voltage power lines.

2. Description of Related Art

As disclosed for example in a paper entitled "Experience with Optical Fibre Aerial Cables on High Tension Power Lines" by C. Jurdens, H. G. Haag and R. Buchwald, given at the Cigré International Conference on Large High Voltage Electric Systems, 1988 Session, non-metallic self-supporting overhead optical cables are supported adjacent towers at respective fixing points along the cable by means of preformed metallic fittings comprising helical wires which form a sheath around the cable and grip it tightly. Stress limiters in the form of toroidal control electrodes prevent corona discharge at the ends of the helical wires. These electrodes are commonly formed of wire wound into a toroidal cage whose centre ring connects mechanically and electrically with the ends of the cable support fitting furthest from the tower.

This known type of stress limiter is expensive to make and, more importantly, difficult to fit in situ. Further, it has been recognized that it is a combination of electrical and mechanical stresses at the interface of the cable and the support which causes degradation and ultimately failure of the cable in this critical area, where the cable is close to a power cable and where the optical cable support is grounded by the tower, and especially in weather conditions such that the optical cable is partly wet and partly dry.

SUMMARY OF THE INVENTION

The purpose of the invention is therefore to provide a support assembly incorporating a form of simple stress limiter which relieves both mechanical and electrical stress and is readily fitted in situ.

The invention provides a support assembly for non-metallic cable incorporating a preformed metallic stress limiter and a metallic support fitting in the form of helical wires which surround a region of the cable and grip it tightly, the stress limiter comprising a generally mushroom-shaped hollow metal body having a tubular stem portion located between one end of the support fitting and the cable, and at one end of the stem portion a hollow part-toroidal head portion consisting of the material of the stress limiter turned back over the adjacent part of the stem portion, and having an outer profile which is smoothly curving. The stem portion in use is inserted between the support fitting and the cable to distribute the mechanical force at the cable interface, and the head portion prevents corona discharge and effectively reduces the electrical tension.

The stress limiter may be formed as a single piece, but preferably in two halves divided along a diametric plane. Where the stress limiter is in two halves, there is the advantage in being able to fit it without first having to thread it over the cable. Where the halves are identical, this makes manufacture more economical and facilitates assembly. The stress limiter is preferably of sheet metal, conveniently a stainless metal such as stainless steel, the head portion being approximately in the form of a hollow toroid.

In such a case the wall of the head portion is preferably provided with at least one drain hole, and in use the stress limiter will then be fitted to a cable with the drain hole lowermost. In some cases the wall of the head portion may have a plurality of holes spaced at different positions around it so that at least one of the holes lies at or adjacent the bottom of the stress limiter and acts as a drain hole when the stress limiter is fitted to a cable.

The stem portion preferably has an unsmooth outer surface so that it is readily gripped in use by the cable support fitting. For example, the stem portion may be textured, splined or otherwise configured externally to provide said readily grippable surface.

There is preferably an annular gap between the stem portion and the head portion on the side designed to face the support fitting in use, to allow the end of the support fitting to be accommodated within the head portion, thereby minimising the electrical stress.

The part of the head portion closest the stem and defining the annular gap preferably has a sharp edge inclined away from the stem end to provide a barb engageable with the support fitting when the end thereof is accommodated within the head portion.

From a different aspect, the invention provides a method of fitting a stress limiter, in accordance with the first aspect of the invention, to a support fitting on an overhead cable comprising: temporarily loosening the support fitting; inserting the stem portion of the stress limiter into the annular gap thus formed between the end of the support fitting and the cable; and re-tightening the support fitting around the stress limiter. Where the stress limiter is formed with a gap between the head and stem portions, the stem portion is preferably pushed fully into the annular gap between the support fitting and the cable so that the end of the support fitting is accommodated within the head portion.

Where the support fitting comprises helically-wound wires, it may be re-tightened by rotation of the stress limiter, which grips the wires.

BRIEF DESCRIPTION OF THE DRAWINGS

One way in which the invention is used will now be described, by way of example, with reference to the accompanying drawings, in which:

FIGS. 1 and 2 are perspective views from different ends of part of an aerial cable supported by a support assembly which includes a support fitting and a stress limiter, embodying the invention;

FIG. 3 is a section taken through a diametric plane of symmetry through the stress limiter of FIGS. 1 and 2; and FIG. 4 is an elevation, in part section, of one half of the two-part stress limiter of FIGS. 1 to 3.

DETAILED DESCRIPTION OF THE PREFERRED EMBODIMENT

An optical aerial cable 10 has entirely non-metallic components including an outermost cylindrical plastic sheath, and is suspended as a continuous length between towers. At each tower, a short length of the cable 10 is supported by a support fitting 12 connected mechanically and electrically to the tower (not shown). The support fitting 12 comprises a layer of steel wires wound helically around the cable in a tight grip. A stress limiter 11 is held between the cable and the ends of the wires.

The stress limiter 11 is a mushroom-shaped hollow, stainless steel preform in two identical halves, one of which is shown in elevation in FIG. 4, conveniently formed from sheet metal. The stress limiter has a tubular stem portion 13 from which depends a generally part-toroidal head portion 14 with a smoothly-curved outer profile for minimizing electrical stress. The stem portion 13 has a slightly greater wall thickness over most of its length, this region of the stem portion being longitudinally splined on its outer surface as shown at 18 in FIG. 4. The stem 13 has a smooth end section 131 which is of smaller diameter, for ease of assembly.

There is at 16 a narrow annular gap between part 15 of the head portion 14 and the splined tubular stem 13, to allow for the insertion of the ends of the wires of the support fitting 12 into the head portion. The dimension of the gap is predetermined to suit the diameter of the cable and the diameter of the wires. Once inserted, the wires are retained axially by the barb effect of the sharp edge of the head portion 15 against which the wires engage. This barb effect is enhanced by the angle of inclination of the re-entrant edge of part 15 which is conveniently about 45° to the axis of rotational symmetry of the stress limiter.

The stress limiter is fitted in situ after fitting the support fitting 12. The end region of the support fitting 12 is partially loosened by slightly unwinding the wires, and both halves of the stress limiter are inserted with the tubular stem portions 13 pushed fully into the gap between cable 10 and wire ends of the support fitting 12, the wire ends extending fully into the toroidal space inside the head portion 14 of the assembled stress limiter. The stress limiter is then rotated manually, the splines of the stem portion 13 gripping the wire ends, to re-tighten the support fitting around the cable 10. The assembly is then stable and the load on the support fitting ensures that it will not unwind.

The smooth, cylindrical inner surface of the stem portion 13 spreads the mechanical load on the cable, reducing mechanical stress.

Conveniently, the wall of the head portion is provided with a plurality of holes spaced at different positions around its peripheral region, for example, as at 17, so that at least one of the holes lies at or adjacent the bottom of the stress limiter, and acts as a drain hole when the stress limiter is fitted to a cable. In some cases however the stress limiter may have a single drain hole only, the stress limiter then being fitted to the cable with the drain hole lowermost.

We claim:

1. A support assembly for an aerial non-metallic cable, comprising:
   (a) a generally mushroom-shaped, metallic stress limiter having a hollow head portion of generally circular cross-section and a hollow, tubular stem portion integral with the head portion and extending therefrom along a longitudinal axis from an inner end region within the head portion to an outer end region axially spaced away from the head portion, said head portion having a smoothly curved exterior surface; and
   (b) a metallic support fitting including a plurality of metallic wires wound helically about the longitudinal axis, and having wire ends that surround and securely grip the stem portion.

2. An assembly according to claim 1, wherein the stress limiter is formed in two halves divided along a diametric plane.

3. An assembly according to claim 2, wherein the two halves of the stress limiter are identical.

4. An assembly according to claim 1, wherein the stress limiter is formed of sheet metal, and the head portion is approximately in the form of a hollow toroid.

5. An assembly according to claim 1, wherein the stem portion of the stress limiter has an unsmooth outer surface which is gripped in use by the wire ends.

6. An assembly according to claim 5, wherein the unsmooth outer surface of the stem portion of the stress limiter is textured.

7. An assembly according to claim 5, wherein the unsmooth outer surface of the stem portion of the stress limiter is splined.

8. An assembly according to claim 5, wherein the unsmooth outer surface of the stem portion of the stress limiter is roughened.

9. An assembly according to claim 1, wherein the head portion forms an annular gap with the stem portion at an intermediate region between the inner and outer end regions of the stem portion, and wherein the head portion bounds an interior space that is in open communication with the gap, and wherein the wire ends pass through the gap and are received within the interior space of the head portion.

10. An assembly according to claim 9, wherein the head portion has a barbed edge bounding the gap, said barbed edge being inclined relative to said axis to resist withdrawal of the wire ends from the interior space of the head portion when the wire ends are subjected to axially-directed forces.

11. An assembly according to claim 1, wherein the wall of the head portion of the stress limiter has at least one drain hole.

12. A method of fitting a stress limiter on an aerial non-metallic cable having a cable end surrounded by a plurality of metallic wires wound helically about a longitudinal axis and terminating in wire ends, comprising the steps of:
   (a) temporarily and partially unwinding the wire ends to form an annular space between the wire ends and the cable;
   (b) providing the stress limiter with a generally mushroom-shaped configuration having a hollow, metallic head portion of generally circular cross-section and a hollow, metallic, tubular stem portion integral with the head portion and extending therefrom along the longitudinal axis from an inner end region within the head portion to an outer end region axially spaced away from the head portion, said head portion having a smoothly curved exterior surface;
   (c) inserting the stem portion into the annular space; and
   (d) re-winding and tightening the wire ends about the stem portion.

13. A method according to claim 12, and further comprising the steps of forming an annular gap between the stem and head portions and providing open communication between the gap and an interior of the hollow head portion; and wherein the inserting step is performed by pushing the wire ends through the gap until the wire ends are received in the interior of the hollow head portion.

14. A method according to claim 13, wherein the re-winding and tightening step is performed by rotating the stress limiter about the axis after the pushing step has been performed.

* * * * *